United States Patent
Debras (12)

(10) Patent No.: US 6,265,500 B1
(45) Date of Patent: Jul. 24, 2001

(54) PRODUCTION OF POLYETHYLENE HAVING IMPROVED MECHANICAL PROPERTIES

(75) Inventor: Guy Debras, Frasnes Lez Gosselies (BE)

(73) Assignee: Fina Research, S.A., Feluy (BE)

( * ) Notice: Subject to any disclaimer, the term of this patent is extended or adjusted under 35 U.S.C. 154(b) by 0 days.

(21) Appl. No.: 09/296,919

(22) Filed: Apr. 22, 1999

(30) Foreign Application Priority Data

Apr. 24, 1998 (EP) .................................................. 98107493

(51) Int. Cl.$^7$ ....................................................... C08F 2/34
(52) U.S. Cl. .............................. 526/65; 526/96; 526/106; 526/348; 526/352
(58) Field of Search .............................. 526/65, 106, 348, 526/352, 96

(56) References Cited

U.S. PATENT DOCUMENTS 5,208,309 * 5/1993 McDaniel et al. ................ 526/348.2

FOREIGN PATENT DOCUMENTS

| 0 307 907 | * | 3/1989 | (EP) . |
| 0307907 | | 3/1989 | (EP) . |
| 0739909 | | 10/1996 | (EP) . |
| 0832905 | | 4/1998 | (EP) . |
| 0 832 905 | * | 4/1998 | (EP) . |

* cited by examiner

Primary Examiner—David W. Wu
Assistant Examiner—William K Cheung
(74) Attorney, Agent, or Firm—Jim D. Wheelington

(57) ABSTRACT

A process for producing a polyethylene resin having improved mechanical properties, the process comprising polymerising ethylene in the presence of a chromium-based catalyst to make polyethylene homopolymer in a first polymerisation reactor and in a second polymerisation reactor downstream of the first polymerisation reactor copolymerising ethylene in the presence of the chromium-based catalyst and a co-catalyst from ethylene monomer and comonomer generated in-situ in the second polymerisation reactor to make polyethylene copolymer.

20 Claims, No Drawings

PRODUCTION OF POLYETHYLENE HAVING IMPROVED MECHANICAL PROPERTIES

BACKGROUND TO THE INVENTION

The present invention relates to a process for producing polyethylene, in particular high density polyethylene having improved mechanical properties.

DESCRIPTION OF THE PRIOR ART

Polyethylene is known for use in the manufacture of a wide variety of articles. The polyethylene polymerisation process can be varied in a number of respects to product a wide variety of resultant polyethylene resins having different physical properties which render the various resins suitable for use in different applications. In particular, it is known to use polyethylene for use in applications where the polyethylene is required to have crack resistance, both resistance to rapid and to slow crack growth. For example, polyethylene is known for use in the manufacture of pipes where it is required that the material of the pipe has sufficient crack resistance so as to avoid inadvertent fracture in service. Polyethylene is also known for use in the manufacture of blow moulded articles where a high environmental stress cracking resistance (ESCR) is required.

Chromium-based catalysts used for the production of polyethylene have been known for some time. It is known in the art that the physical properties, in particular the mechanical properties, of a polyethylene product can vary depending on what catalytic system was employed to make the polyethylene. This is because different catalyst systems tend to yield different molecular weight distributions in the polyethylene produced.

It is further known in the art that the mechanical properties of a polyethylene resin, for example the ESCR for blow moulding resins, the impact resistance for film forming resins, and slow crack growth resistance for pipe forming resins, tend to be better when the high molecular weight fraction of the polyethylene is copolymerised.

U.S. Pat. No. 5,208,309 discloses the manufacture of linear very low density polyethylene in which a copolymer of ethylene and a higher alpha-olefin is produced using an activated and subsequently carbon monoxide reduced chromium containing catalyst system and an alkyl aluminium or alkyl boron co-catalyst. The specification states that in the process disclosed therein, it is believed that additional comonomers, i.e. in addition to those added to the polymerisation reactor, can be generated in-situ in the polymerisation reactor or in the reaction zone. Such comonomer is incorporated into the copolymer.

EP-A-0307907 discloses a process for olefin polymerisation in which in-situ comonomer production is employed using a carbon monoxide reduced polymerisation catalyst system. The addition of hydrogen to the reactor enables the regulation and control of the characteristics of the resultant polymer.

The processes disclosed in those two patent specifications suffer from the disadvantage that apart from the density of the resultant polyethylene being low, around 0.890 to 0.915 g/cc for U.S. Pat. No. 5,208,309 and around 0.93 to 0.94 g/cc for EP-A-0307907, the resultant polymer does not have particular broad molecular weight distribution or a particularly high shear response (SR), the shear response being the ratio of the high load melt index (HLMI) and the melt index ($MI_2$).

EP-A-0832905 discloses a process for preparing polyethylene having a large molecular weight distribution employing two reactors in series and in which a polyethylene homopolymer is produced in the first reactor and a polyethylene copolymer with 1-hexene is produced in the second reactor by the addition of hexene into the second reactor.

EP-A-0739909 discloses the production of ethylene polymers using, for example, a single reactor having two separated stages simulating two reactors in series. The first polymer is a copolymer of ethylene with hexene and the second polymer is produced by additionally adding hydrogen into the reactor.

SUMMARY OF THE INVENTION

The present invention aims in one aspect to provide a process for producing polyethylene having improved mechanical properties.

Accordingly, the present invention provides a process for producing a polyethylene resin having improved mechanical properties, the process comprising polymerising ethylene in the presence of a chromium-based catalyst to make polyethylene homopolymer in a first polymerisation reactor and in a second polymerisation reactor downstream of the first polymerisation reactor copolymerising ethylene in the presence of the chromium-based catalyst and a co-catalyst from ethylene monomer and comonomer generated in-situ in the second polymerisation reactor to make polyethylene copolymer.

As a result of the in-situ generation of comonomer, no comonomer is introduced into the second reactor. This avoids the need for a comonomer feed to the reactor system.

Preferably, the chromium-based catalyst has been chemically reduced, for example by carbon monoxide, prior to the introduction thereof into the first polymerisation reactor. More preferably, the chromium-based catalyst additionally contains titanium.

The present invention is predicated on the surprising discovery by the present inventors that the use of a two-stage polymerisation process using a chromium-based catalyst, wherein only ethylene is introduced as a monomer and the catalyst systems present in the first and second stages are controlled so as to produce in the first stage a homopolymer and the in the second stage a copolymer in which comonomer generated in-situ in the second stage is incorporated into the copolymer, can in turn yield a broader molecular weight distribution and a higher shear response for the resultant polyethylene resin, in turn yielding improved mechanical properties for the resin.

The chromium-based catalyst preferably comprises a supported chromium oxide catalyst having a titania-containing support, for example a composite silica and titania support. A particularly preferred chromium-based catalyst may comprise from 0.5 to 5 wt % chromium, preferably around 1 wt % chromium, such as 0.9 wt % chromium based on the weight of the chromium-based catalyst. The support comprises from 1 to 5 wt % titanium, preferably at least 2 wt % titanium, more preferably around 2 to 3 wt % titanium, yet more preferably around 2.3 wt % titanium based on the weight of the chromium-based catalyst. The chromium-based catalyst may have a specific surface area of from 200 to 700 $m^2/g$, preferably from 400 to 550 $m^2/g$ and a volume porosity of greater than 2 cc/g preferably from 2 to 3 cc/g.

A particularly preferred chromium-based catalyst ("catalyst 1") for use in the present invention has an average pore radius of 190 A, a pore volume of around 2.1 cc/g, a specific surface area of around 510 $m^2/g$ and a chromium content of around 0.9 wt % based on the weight of the chromium-containing catalyst. The support comprises a composite silica and titania support. The amount of titania in the support provides that the catalyst as a whole comprises around 2.3 wt % titanium.

The catalyst may be subjected to an initial activation step in air at an elevated activation temperature. The activation temperature preferably ranges from 500 to 850° C., more preferably around 700 to 800° C.

The chromium-based catalyst is preferably subjected to a chemical reduction process in which at least a portion of the chromium is reduced to a low valence state. Preferably, the chromium-based catalyst is reduced in an atmosphere of dry carbon monoxide in nitrogen gas, typically 8% CO in $N_2$ at a temperature of from 250 to 500° C., more preferably around 340° C., for a period typically around 30 minutes.

In the preferred polymerisation process of the present invention, the homopolymerisation and copolymerisation processes are carried out in the liquid phase, the liquid comprising ethylene in an inert diluent. The inert diluent is preferably isobutane. The homopolymerisation or copolymerisation process is typically carried out at a temperature of from 80 to 110° C., more preferably from 90 to 100° C., and at a pressure of from 20 to 42 bars, more preferably at a minimum pressure of around 24 bars. The temperature is selected so as to obtain a particular molecular weight distribution in each of the homo- and co-polymers produced in the first and second reactors respectively.

Typically, in the homopolymerisation and copolymerisation processes, the ethylene monomer comprises from 0.5 to 8% by weight, typically around 6% by weight, of the total weight of the ethylene in the inert diluent. Since the comonomer is generated in-situ in the second reactor, no comonomer is fed to the second reactor. All of the comonomer copolymerised with ethylene in the second reactor is generated in-situ in the second reactor.

In the first stage of the polymerisation process the chromium-based catalyst is used alone in the absence of a co-catalyst. In the second stage of the polymerisation process a co-catalyst comprising at least one metal alkyl and/or at least one alkyl metal oxane is introduced together with further ethylene monomer. The metal alkyl preferably comprises triethyl boron (TEB), triethyl aluminium (TEA), dibutyl magnesium ($MgBu_2$), diethyl zinc (DEZ) or butyl lithium (BuLi). The alkyl metal oxane preferably comprises diethyl aluminium ethoxy (DEALE) or methyl aluminium oxane (MAO). Preferably, the co-catalyst is introduced into the second polymerisation reactor in an amount of at least 1 ppm, more preferably from 2 to 10 ppm, based on the weight of the inert diluent. The amount of co-catalyst employed is selected so as to provide in the copolymer produced in the second polymerisation reactor a selected density for the copolymer.

In accordance with the process of the invention, the chromium-based catalyst, preferably having being reduced by carbon monoxide, is introduced into a first polymerisation reactor together with ethylene monomer. The ethylene homopolymerises to form polyethylene and typically the resultant polyethylene, if discharged from the first polymerisation reactor, has an HLMI of from around 24 to around 31 g/10 min (the HLMI being measured using the procedures of ASTM D 1238 using a load of 21.6 kg at 190° C.), and a density of at least around 0.96 g/cc. The homopolymer produced in the first reactor comprises the relatively high density, relatively low molecular weight, fraction of the resultant polyethylene resin.

The product from the first polymerisation reactor is then fed into the downstream second polymerisation reactor and the metal alkyl and additional ethylene are introduced into the second polymerisation reactor. The provision of the co-catalyst of at least one metal alkyl and/or at least one alkyl metal oxane causes in-situ generation of comonomer from the ethylene whereby such comonomer is introduced into the polyethylene resin including both homopolymer and copolymer to form a polyethylene copolymer. As for the first reactor, the polymerisation temperature in the second reactor can be selected for targeting a particular molecular weight distribution in the resultant polyethylene resin. The resultant polyethylene resin including both homopolymer and copolymer is discharged from the second reactor and then separated from the diluent which can be recycled. The resultant polyethylene resin typically comprises from 40 to 60 wt % homopolymer produced in the first reactor and from 60 to 40 wt % copolymer produced in the second reactor. A most typical polyethylene resin comprises equal amounts by weight of the homopolymer and the copolymer.

The resultant polyethylene resin tends to have a lower density and a lower HLMI than the homopolymer produced in the first polymerisation reactor. This is because in the second polymerisation reactor, as a result of the in-situ generation of comonomer, a copolymer is produced which tends to have a relatively high molecular weight and a relatively low density as compared to the homopolymer produced in the first polymerisation reactor. This yields in turn for the composite polyethylene resin a broad molecular weight distribution and a high shear response, providing improved mechanical properties for the resin. Typically, in the resultant polyethylene resin the density is around 0.95 g/cc, most typically ranging from around 0.945 to around 0.955 g/cc, and an HLMI ranging from around 5 to around 40 g/10 min.

The process of the invention can provide polyethylene resins having improved mechanical properties. The homopolymer produced in the first polymerisation reactor has a relatively low molecular weight and the copolymer produced in the second polymerisation reactor has a relatively high molecular weight, the amount of comonomer which has been generated in-situ in the second reactor and has been introduced into the copolymer tending to have a distribution thereof in the copolymer which decreases at increasing molecular weight. When the two resin fractions are mixed together in the resultant polyethylene resin, the two molecular weight distributions overlap, thereby yielding in the resultant polyethylene resin a broad molecular weight distribution and a high shear response. This in turn provides improved mechanical properties, such as environmental stress crack resistance, impact resistance and slow crack growth resistance.

DETAILED DESCRIPTION OF THE PREFERRED EMBODIMENTS

The present invention will now be described with reference to the following non-limiting Examples.

EXAMPLES 1 TO 7

In these examples, a polyethylene resin was produced by the polymerisation process of the present invention, in which a two-step polymerisation process was employed with two serially-connected polymerisation reactors. In the first reactor, ethylene in isobutane as an inert diluent was introduced into the reactor together with the chromium-based catalyst identified as catalyst 1 above which had been activated in dry air at a temperature of around 800° C. and had been subjected to carbon monoxide reduction at a temperature of around 340° C. for a period of around 30 minutes in an atmosphere comprising 8% CO in nitrogen gas. The catalyst had a pore volume of 2.1 cc/g and a specific surface area of 510 m$^2$/g. The catalyst comprised 0.9% Cr and 2.3% Ti, each based on the weight of the catalyst. The ethylene was present in the isobutane as an inert diluent in an amount of around 4 wt %. The polymerisation temperature was around 95° C. and the polymerisation pressure was around 30 bars. These Examples were performed at this pressure on bench-scale reactors. In liquid-full reactors, typically used in commercial production, the pressure would be around 40 bars. In the first polymerisation reactor, a polyethylene homopolymer was formed which was then fed as polyethylene fluff to the second serially connected reactor downstream of the first reactor. The chromium-based catalyst was also conveyed to the second reactor and an additional metal alkyl or alkyl metal oxane co-catalyst was introduced into the second reactor, together with additional ethylene monomer. In the second polymerisation reactor, the ethylene comprised around 6 wt % ethylene in the isobutane inert diluent. The reaction temperature was around 95° C., as for the first reactor, and the pressure was slightly lower than that for the first reactor to provide throughput of the reactants and the catalyst from the first reactor to the second reactor. Table 1 shows the type of co-catalyst introduced into the second reactor in each of Examples 1 to 7, together with the amount of such co-catalyst.

Table 1 also shows the properties, namely the HLMI and the density, of the polyethylene homopolymer produced in the first reactor in each of Examples 1 to 7, together with the properties, namely the HLMI and the density, of the resultant polyethylene resin produced following production of the polyethylene copolymer in the second reactor. For each Example, the polyethylene homopolymer produced in the first reactor comprised around 50 wt % of the resultant polyethylene resin.

EXAMPLE 8

In this Example, the chromium-based catalyst comprised the same catalyst as in Examples 1 to 7, but the catalyst had not been subjected to a preliminary carbon monoxide reduction step and had been activated at a lower temperature of 720° C. The polymerisation process was otherwise performed in the same manner as for Examples 1 to 7. In the first reactor, the temperature was around 106° C. and the properties of the resultant polyethylene and the polymer are specified in Table 2. The polyethylene homopolymer comprised 50 wt % of the resultant polyethylene resin. In the second reactor, the temperature was reduced to around 80° C. and 10 ppm TEB were introduced into the reactor. The properties of the resultant polyethylene resin are specified in Table 2.

It may be seen from Table 2 that the use of a chromium-based catalyst which had not been subjected to carbon monoxide reduction yielded on the one hand a greater HLMI and on the other hand a lower density for the resultant polyethylene resin than for Examples 1 to 7. This indicates that the polyethylene homopolymer had a relatively low molecular weight distribution.

For the resultant polyethylene resin following the production of the polyethylene copolymer in the second reactor, it may be seen that the HLMI value is particularly low, this indicating a high molecular weight for the polyethylene copolymer, and in turn indicating low formation of the in-situ comonomer in the second reactor.

TABLE 1

|  | Example 1 | Example 2 | Example 3 | Example 4 | Example 5 | Example 6 | Example 7 |
| --- | --- | --- | --- | --- | --- | --- | --- |
| REACTOR 1 PRODUCT |  |  |  |  |  |  |  |
| HLMI (g/10') | 30.6 | 28.2 | 30.8 | 26.2 | 31.4 | 24.7 | 25.8 |
| density (g/cc) | .9639 | .9634 | .964 | .963 | .9642 | .9637 | .9639 |
| wt % | 50 | 50 | 50 | 50 | 50 | 50 | 50 |
| REACTOR 2 METAL ALKYL OR ALKYL METAL OXANE CO-CATALYST |  |  |  |  |  |  |  |
| type | TEB | TEB | TEB | DEALE | DEALE | TEA | TEA |
| ppm | 2 | 4 | 8 | 4 | 8 | 4 | 8 |
| PRODUCT |  |  |  |  |  |  |  |
| HLMI (g/10') | 18.2 | 30.4 | 39.7 | 15.8 | 28.7 | 9.9 | 11.8 |
| density (g/cc) | .9540 | .9496 | .9458 | .9527 | .9495 | 0.9545 | .9532 |

TABLE 2

|  | EXAMPLE 8 |
| --- | --- |
| REACTOR 1 |  |
| T (° C.) | 106 |
| HLMI (g/10') | 60 |
| density (g/cc) | .964 |
| wt % | 50 |
| REACTOR 2 |  |
| T (° C.) | 80 |
| TEB (ppm) | 10 |
| HLMI (g/10') | 7.28 |
| MI$_2$ (g/10') | 0.028 |
| density (g/cc) | .9503 |
| SR | 280 |

What is claimed is:

1. A process for producing a polyethylene resin having improved mechanical properties, the process comprising polymerizing ethylene in the presence of a chromium-based catalyst to make polyethylene homopolymer in a first polymerization reactor and in a second polymerization reactor downstream of the first polymerization reactor copolymerizing ethylene in the presence of the chromium-based catalyst and a co-catalyst from two reactants consisting of ethylene monomer and comonomer, all of the comonomer having been generated in-situ in the second polymerization reactor to make polyethylene copolymer.

2. A process according to claim 1 wherein the chromium-based catalyst has been chemically reduced prior to the introduction thereof into the first polymerisation reactor.

3. A process according to claim 2 wherein the chromium-based catalyst has been chemically reduced by carbon monoxide.

4. A process according to claim 1 wherein the chromium-based catalyst has a titania-containing support.

5. A process according to claim 1 wherein the chromium-based catalyst comprises about 1 wt % chromium and from 1 to 5 wt % titanium, each based on the weight of the chromium-based catalyst.

6. A process according to claim 5 wherein the chromium-based catalyst comprises from 2 to 3 wt % titanium, based on the weight of the chromium-based catalyst.

7. A process according to claim 1 wherein the co-catalyst is selected from at least one of a metal alkyl and an alkyl metal oxane.

8. A process according to claim 7 wherein the co-catalyst comprises at least one metal alkyl selected from at least one of triethyl boron, triethyl aluminium, dibutyl magnesium, diethyl zinc and butyl lithium.

9. A process according to claim 7 wherein the alkyl metal oxane is selected from at least one of diethylene aluminium ethoxy and methyl aluminium oxane.

10. A process according to claim 1 wherein the co-catalyst is present in an amount of from 2 to 10 ppm based on the weight of an inert diluent for the ethylene monomer in the polymerisation reactors.

11. A process according to claim 1 wherein the polyethylene resin comprises from 40 to 60 wt % of the homopolymer and from 60 to 40 wt % of the copolymer.

12. A process according to claim 1 wherein the polyethylene resin has an HLMI of from 5 to 40 g/10 min.

13. A process according to claim 1 wherein the polyethylene resin has a density of from 0.945 to 0.955 g/cc.

14. A process according to claim 1 wherein the homopolymer produced in the first polymerization reactor has a density of at least about 0.96 g/cc.

15. A process for producing a polyethylene resin having a density of from 0.945 to 0.955 g/cc, the process comprising polymerizing ethylene in the presence of a chemically reduced chromium based catalyst in a first polymerization reactor to make ethylene homopolymer and in a second polymerization reactor downstream of the first polymerization reactor copolymerizing ethylene in the presence of the chromium-based catalyst and a co-catalyst selected from at least one of a metal alkyl and an alkyl metal oxane from two reactants consisting of ethylene monomer and comonomer generated in-situ in the second polymerization reactor to make ethylene copolymer.

16. A process according to claim 15 wherein the polyethylene resin comprises from 40 to 60 wt % of the homopolymer and from 60 to 40 wt % of the copolymer.

17. A process according to claim 15 wherein the polyethylene resin has an HLMI of from 5 to 40 g/10 min.

18. A process according to claim 15 wherein the homopolymer produced in the first polymerization reactor has a density of at least about 0.96 g/cc.

19. A process according to claim 15 wherein the chromium-based catalyst has been chemically reduced by carbon monoxide.

20. A process according to claim 15 wherein the chromium-based catalyst comprises about 1 wt % chromium and from 1 to 5 wt % titanium, each based on the weight of the chromium-based catalyst.

* * * * *